INVENTORS
CHARLES A. COOLIDGE, JR
MARSHALL M. KINCAID
BY
Dike, Thompson, Bronstein & Mrose
ATTORNEYS Oct. 29, 1968 C. A. COOLIDGE, JR., ET AL 3,408,505

ELECTRONIC TIMING VIA MAGNETIC CORE SHIFT CIRCUITRY

Filed Dec. 18, 1963

2 Sheets-Sheet 2

INVENTORS
CHARLES A. COOLIDGE, JR.
MARSHALL M. KINCAID
BY
Dike, Thompson, Bronstein & Mrose
ATTORNEYS United States Patent Office 3,408,505

Patented Oct. 29, 1968

3,408,505

ELECTRONIC TIMING VIA MAGNETIC CORE SHIFT CIRCUITRY

Charles A. Coolidge, Jr., Belmont, and Marshall M. Kincaid, Winchester, Mass., assignors to C & K Components, Inc., Watertown, Mass., a corporation of Massachusetts Filed Dec. 18, 1963, Ser. No. 331,472
9 Claims. (Cl. 307—88)

ABSTRACT OF THE DISCLOSURE

Timed electrical output signals are developed electronically and with low average power consumption by an RC-controlled pulse generator regulating the shifts of magnetically-stored data in a normally passive shift register array and thereby triggering a normally substantially non-conductive output circuit into conduction when the data stored in the shift register array assumes a predetermined pattern.

Figure 1:
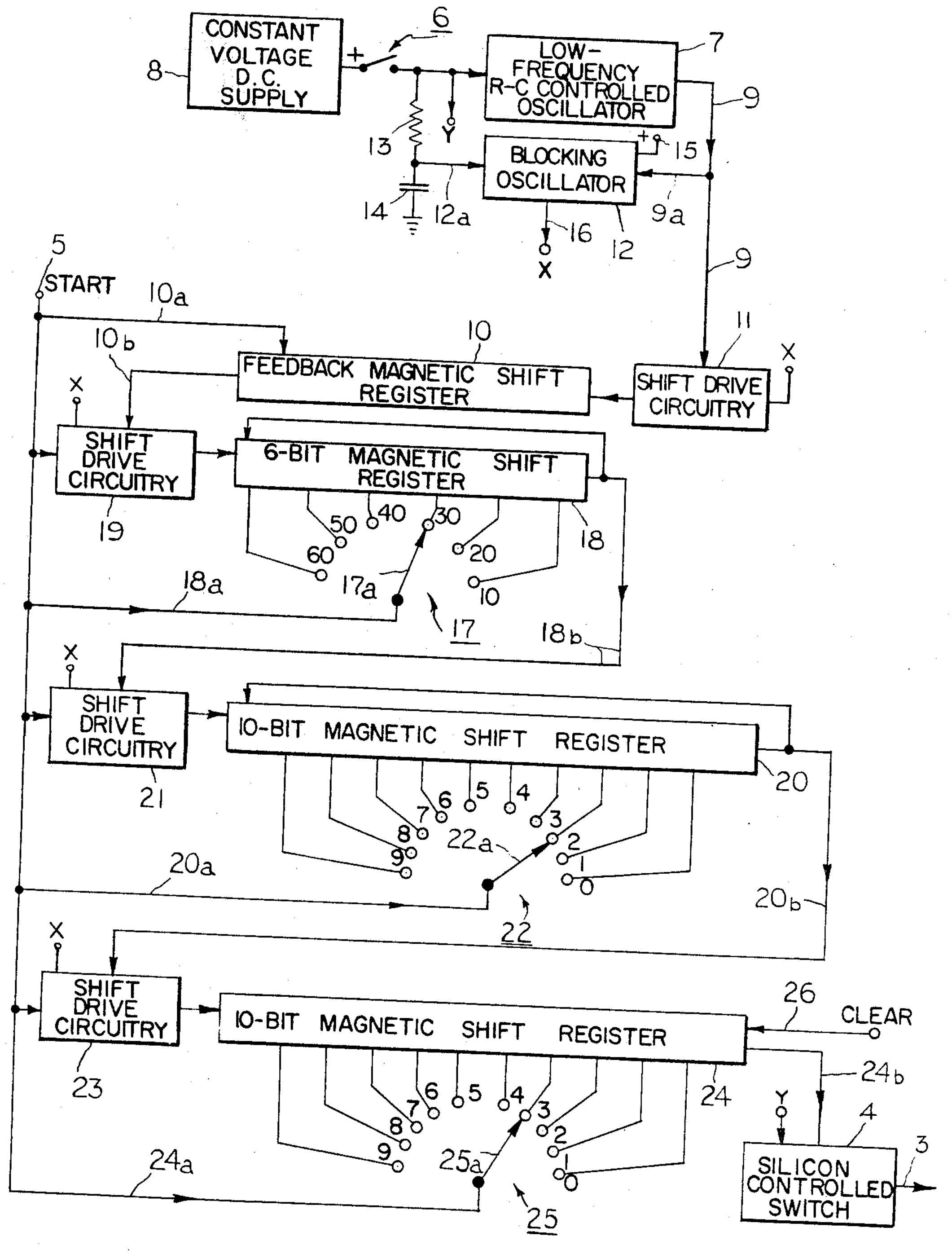

The present invention relates to improvements in electronic timing, and, in one particular aspect, to novel and improved electronic timers of low-cost and reliable construction wherein digital magnetic-core counters and driving and output detector equipment are synchronously operated by low-duty-cycle pulses produced by low-frequency RC-controlled generators which promote great economies in average power consumption.

Electronic counters, such as those which involve And elements and transistorized flip-flops or magnetic cores, are well known in many versions, including sequential, ring and multi-stage arrays. When the input signals to such counters are caused to exhibit a regular periodicity, a timing function can be developed, apparatus based upon such principles may delay production of timed electrical output signals over very long periods, for triggering and control purposes, for example. Timers which involve magnetic core arrays are particularly attractive, because of the exceptionally small size, low average power requirements, and outstanding thermal- and shock-resistance characteristics of these elements. Although magnetic core counting elements are themselves inherently capable of operation with very low average power drain, the associated clocking, driving and readout equipments needed for timing purposes have hitherto prevented accrual of any substantial advantage from that fact, and high power requirements have constituted a serious handicap. Battery operation of such timers may be a necessity, over periods which may be as long as a year or more, and it is evident that no large average power requirement is likely to be satisfied with small and relatively inexpensive cells.

It has been proposed that precise electrical clocking generators such as 400-cycle tuned reeds and 10-kc. crystal oscillators be used to develop highly regulated electrical signals which could be counted for timing purposes; unfortunately, the unfavorable duty cycles of the substantially sinusoidal outputs from these generators result in large average power consumption from the source. In accordance with the present teachings, however, the basic clocking is, instead, developed by very short pulses which occur at a very low repetition rate, and which are produced by a relatively simple transistorized RC-controlled generator having high-resistance circuitry which itself operates on but relatively little power. These short pulses are placed in control of all drive and detection circuitry in the timing system, and such circuits are caused to operate on a low-duty-cycle pulsed basis with substantially no standby power being consumed by them; the magnetic core storage elements which serve the counting functions likewise dissipate no power except when only briefly pulsed at relatively infrequent intervals. Integration of the low-frequency clocking pulses within long-term counting circuitry produces averaging effects which avoid the need for extremely precise regulation of the clocking pulse generator.

It is one of the objects of the present invention, therefore, to provide novel and improved electronic timing at low cost yet with high accuracy and particularly low average electrical power.

Another object is to provide miniaturized solid-state electronic timers involving magnetic core counters and in which clocking signals are generated under control of high-resistance RC circuitry.

A further object is to provide pulsed electronic timers capable of performing accurate timing over particularly long intervals with only very low average power consumption under control of low-duty-cycle pulses.

Still further it is an object to provide for the improved reading of magnetic cores in a pulsed timer system by a polarized voltage detector which detects conditions evidencing predetermined time lapses without consuming high average power.

It is another object to provide miniaturized timers of economical manufacture wherein power consumption and the number of magnetic cores involved in accurate counting operations are minimized by short low-frequency pulsing of core, driver, detector and other associated electronic timer circuitry.

By way of a summary account of practice of this invention in one of its aspects, short low-frequency pulses, such as 1 microsecond pulses occurring about every three seconds, are developed by a transistorized RC-controlled or LC-controlled generator powered by a substantially constant-voltage battery. Good regulation of pulse periodicity is attained through use of the constant-voltage source and through use of a normally cut-off buffer amplifier output stage which is wholly passive except when it responds to the generated output pulses, this buffer stage preventing such loadings of the capacitance in the RC circuitry as would cause the generated pulses to vary materially in periodicity. The short low-frequency output pulses from this generator provide the input to a magnetic core counter, such as a recirculating shift register type of counter preferably involving at least one modulus adder, which conserves cores, and commensurately short shift drive signals are derived from these pulses by transistorized drive circuitry which remains in cut-off condition except when pulsed. The states of different predetermined cores in the counter are taken as an indication that a certain time has passed, and a transistorized polarized voltage detector which leases a cut-off condition only in response to the ultimate simultaneous changes in state at these sites develops a high-power output suitable for actuating an output device which is being timed.

Figure 2:
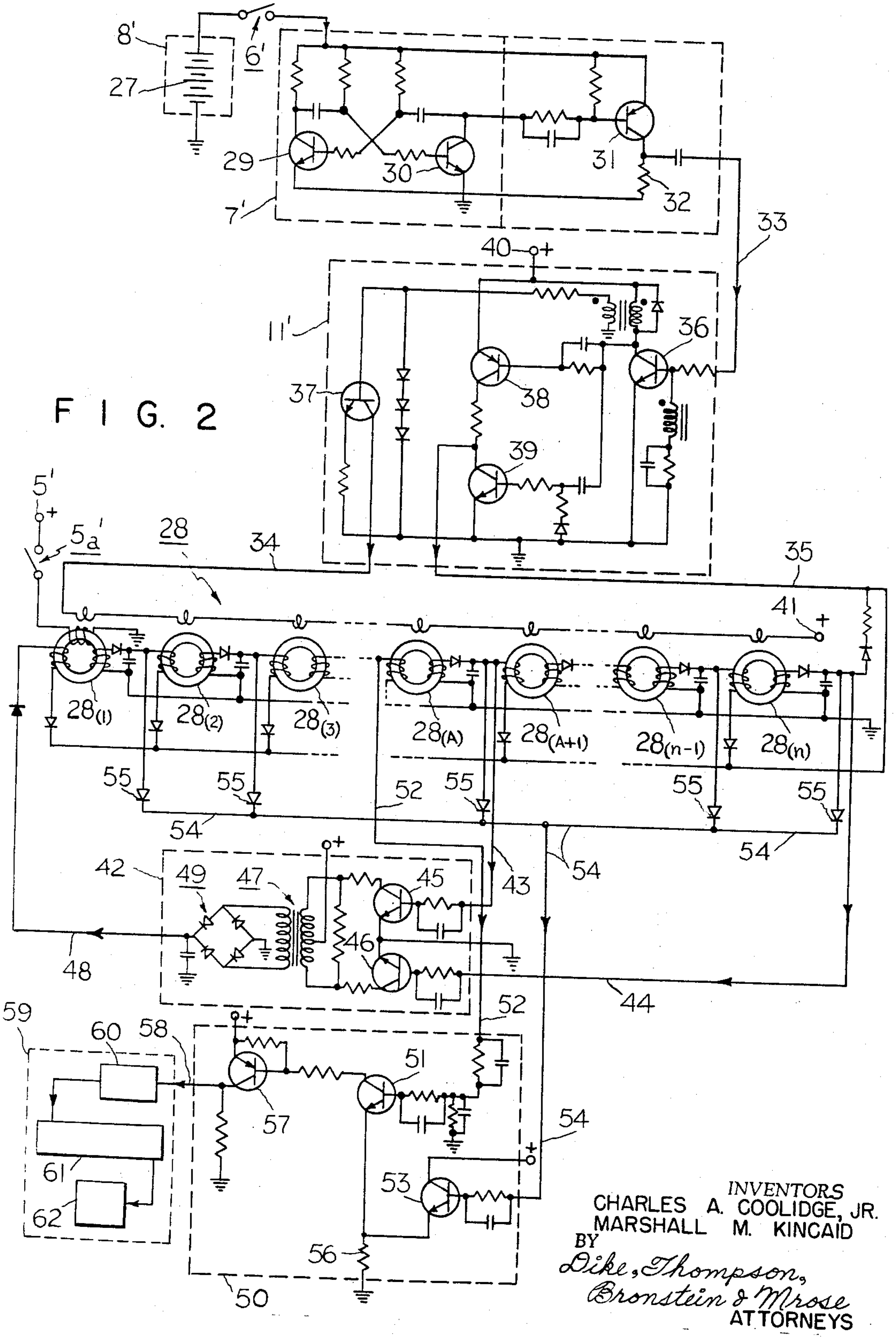

Although the features of this invention which are believed to be novel are set forth in the appended claims, greater detail as to practice of the invention in its preferred embodiments, and the further objects and advantages thereof, may be readily comprehended through reference to the following description taken in connection with the accompanying drawings, wherein:

FIGURE 1 is a partly schematic and partly block-diagrammed illustration of an improved electronic timer expressing teachings of the present invention; and FIGURE 2 depicts schematically another arrangement of low-power solid-state timer circuitry involving a recirculating magnetic core counter and polarized voltage detector.

The timing arrangement illustrated in FIGURE 1 is that of a 100-hour timer which develops a high-power output signal in the output lead 3 of a conventional silicon controlled switch 4 at a predetermined time, up to 100 hours, after an electrical gating or "start" signal is applied to the Start terminal 5 following closure of the D.C. source switch 6. Accurate timing results from the counting of pulses generated at a predetermined regulated rate by a low-frequency RC-controlled oscillator 7, the latter being supplied with electrical excitation by a constant voltage D.C. supply 8, preferably in the form of a high-quality long-life mercury battery. Oscillator 7 is the basic clock for the system, and it is intentionally selected as an RC-controlled device so that it can develop pulse outputs, at a very low frequency (i.e. repetition rate), and with a high resistance (the R parameter of the RC combination) in circuit with the battery. The latter two factors are of particular significance because only very low current drain from the battery need then occur in the RC circuitry, while high-power output pulses are nevertheless derived from the capacitor when it discharges almost instantly at relatively infrequent intervals. In the illustrated 100-hour timer, the oscillator 7 is constructed in accordance with known design theory to produce an output at only about 0.8517 c.p.s. at a regulation of about ±1%, the pulse durations being only of the order of one or a few microseconds. The resulting duty cycle is exceedingly low. A multivibrator or known type of unijunction relaxation oscillator serves these oscillator purposes, for example. As is referred to later herein, in connection with the FIGURE 2 circuitry, it is highly advantageous to isolate the RC network from loading, and a buffer amplifier, normally in a cut-off condition to suppress power losses, is included within the oscillator package for this purpose.

Sharp low-periodicity pulse output signals from oscillator 7 appear in line 9 to control the shifting in feed-back magnetic shift register 10, through shift drive circuitry 11. The latter circuitry provides amplification of the pulses, insuring that they will adequately energize the shift windings in the register and achieve the needed advances in information through the register. The sharp low-periodicity pulses appearing in line 9 are also applied over branch line **9*a* to a unit 12 having blocking oscillator characteristics. Each applied pulse causes the blocking oscillator to develop one discrete pulse of predetermined short duration and relatively high power, after which the oscillator resumes a passive state involving negligible power dissipation until the next succeeding input pulse is received, and so on. The illustrated combination of series resistance 13 and shunt capacitance 14 in the D.C. line 13*a* to blocking oscillator 12 provides fail-safe protection against the possibility that spurious pulses in this line might drive the oscillator at repetition rates higher than intended; when the blocking oscillator pulses at more than about three times its normal rate, the voltage drops across resistance 13 causes capacitor 14 to maintain a low voltage on line 12*a* and thus cuts off the oscillator from firing for a substantial period. Counting in the system may be stopped by withdrawing power from the input terminal 15 of the oscillator, which power need not be more closely regulated than to about ±30%, for example. Relatively high-power output signals in short single-pulse form are developed with the same periodicity as the short pulses from the low-frequency RC-controlled oscillator 7; these are applied via output lead 16** to each of the shift drive circuitry power input terminals X in the system to insure that these circuits will consume power only for a few microseconds out of each of the relatively long periods for pulse repetition.

When counting is to commence, at least one momentary electrical gating signal is applied to "Start" terminal 5 from any convenient source, such as a battery and manually- or automatically-operated switch, and this is applied over line **10*a* as an input to the feedback shift register. The feedback shift register is thus caused to assume a core magnetization pattern which, following the application of successive shift pulses for ten minutes from shift drive circuitry 11, will result in an output pulse on the output line 10*b* and a feedback to its own input for recycling to produce another output pulse at the end of another ten minutes. Unless the minute switch 17 has been set to something other than the 60-minute adjustment, the 6-bit magnetic shift register 18 will begin its counting via its first, or input core when the feedback shift register 10 develops its first output pulse on line 10*b*. At this time, the shift drive circuitry 19 serving the register 18 is synchronously energized by the power pulse output of blocking oscillator 12 and therefore develops a shift signal which is effective to transfer the stored data in the first core of register 18 on to the second core thereof. In this connection, it should be recognized that the first core had earlier been set to a "One" state by the gating signal applied to "Start" terminal 5 when counting was commenced in the system. This gating signal appeared on line 18*a*, whence it flowed to the first core through switch arm 17*a* and the 60-minute tap of switch 17. The illustrated setting of this switch arm is at the 30-minute tap, however, and it will be understood that the latter adjustment is one which would restrict the counting to a lesser number of cores in register 18 and would thus result in a lesser timing (30 minutes, in the illustrated condition) through this stage of the system. Counting times up to an hour, in ten-minute intervals, are selectable in this stage by manual adjustment of the "hour" switch arm 17*a* so that the gating signal is applied to set the "One" state of any selected one of the six cores in register 18. Core shifting occurs only as register 10 delivers its output pulses at ten-minute intervals, and shift-drive circuitry 19, though pulsed more frequently by the output of blocking oscillator 12, is cut off and does not deliver output power except when the ten-minute output pulses from register 10** are also presented to it.

Line **18*b* next applies the timed "hour" pulse output (or selected ten-minute multiples) to a 10-bit magnetic shift register 20, through the further shift drive circuitry 21, the resulting actions being much like those referred to in the case of the "hour" register 18. Depending upon the manually set adjustment of switch arm 22*a* of switch 22, the 10-bit shift register 20 may be arranged to deliver an output pulse in line 20*b* at the end of a period from one to ten hours, selectably, after the delivery of the first output pulse to the "minutes×10" stage output line 18*b*. As illustrated, the "hours" stage switch 22 is set to produce its timed output pulse after two hours and this is applied to shift drive circuitry 23 serving the 10-bit magnetic shift register 24 associated with the "hours×10" stage switch 25. Shifting first occurs within the register 24 when drive circuitry 23 witnesses both the output pulse from line 20*b* of the preceding stage and an output pulse from oscillator 12. Depending upon the selectable setting which switch arm 25*a* had at the time when the initial gating pulse appeared on its line 24*a*, the shift register 24 will deliver an output pulse to the silicon controlled switch 4 over output line 24*b* at a selected time in multiples of 10 hours up to 100 hours after the timing system has been placed into timing operation. Silicon controlled switch 4, a device well known in the art, remains essentially passive, insofar as power drain from battery 8 is concerned, until pulsed by the output appearing in line 24*b*, and thus preserves the operating electrical power economy which is of such importance in this timer. When triggered, however, switch 4 delivers a sustained high-power electrical signal to output line 3, and this is sufficient to actuate an appropriate timed end device, such as an indicator, fuse, or the like. "Clear" line 26 designates a provision for applying a suitable electrical inhibit signal, from any convenient source, to windings on all cores of the 10-bit register 24 in a sense to read in all "Zeros" to them, thereby preventing the timer from delivering any spurious output signal until the "Start" command is given at terminal 5**.

The embodiment represented schematically in FIGURE 2 includes a number of features in common with those of the timer of FIGURE 1, and certain of the schematic portrayals are thus typical of circuits which may be employed in construction of timers of either type. Supply 8′ is there illustrated as a battery, 27 (example: 10.8 volt mercury battery) and operation of the timer is commenced by first closing switch 6′ and then applying an electrical gating or "start" signal to the recirculating counter 28, as by closing switch 5a′ in circuit with the "start" supply terminal 5′. The pulses required for accurate low-power timing in accordance with these teachings are generated at a predetermined closely-regulated rate by the low-frequency RC-controlled oscillator 7′ which is energized by source 8′ and which is a relaxation oscillator in the form of a transistorized temperature-compensated multivibrator. The critical capacitance and high resistance parameters in this circuit control the alternate conductions of the transistors 29 and 30, and the isolating transistorized amplifier 31 is triggered into conduction each time a positive output pulse is developed by multivibrator transistor 30. Corresponding short output pulses are developed across resistance 32 and are coupled to the output line 33 where they appear at a desired relatively long-term periodicity, such as a period of 3.3416±5% seconds, in one example. The duty cycles involved throughout are kept very low, with consequent advantageous conservation of supply power. Isolation afforded by the buffer amplifier stage aids in maintaining precision in the low-frequency multivibrator by avoiding undue loading. In an alternative construction, a unijunction relaxation oscillator may be substituted for the multivibrator, for example.

Magnetic shift register driver 11′ receives each output pulse from the multivibrator 7′ and responds by developing related shift and transfer pulse outputs in lines 34 and 35, respectively. Transistor 36 provides a first stage of amplification, while a next stage transistor 37 delivers the relatively high-current shift pulse and the two transistors 38 and 39 are in another stage which yields the transfer voltage pulse for the core circuitry in the recirculating magnetic core shift register 28. These transfer pulses aid in setting the shift register capacitors to "zero" and transferring any information stored in them to the cores which follow. Positive supply terminals 40 and 41 serve these amplifier stages, and, advantageously, the power sources for this purpose (not illustrated) need not be precisely regulated. These stages dissipate no significant power in intervals between occurrence of relatively short pulses, and thus maintain average-power economy which is highly important to timing over very prolonged periods without attention.

The number of magnetic cores which must be used to count pulses and characterize elapsed time in a long-period electronic timer may be minimized through application of recirculation techniques such as are exploited in modulus counters. Counter 28 represents a special form of feedback circuitry in which the "One" state initially written into the first core $28_{(1)}$, is shifted to the succeeding cores, $28_{(2)}$, $28_{(3)}$, etc. to the last core $28_{(n)}$, in the shift register sequence, all in accordance with known practices as the periodic output pulses from driver 11′ are effective to cause the core states to shift progressively. However, selective feedback of the shifted pulses in accordance with predetermined logic causes re-writing of a "One" state into the first core when certain conditions at more than one core site are satisfied, and as a result of this, a desired-characteristic and distinguishable pattern of core conditions is caused to appear cyclically in the core array. The cycle involved is one which incurs a substantial delay between successive appearances of the distinguishable pattern, and thereby promotes long timing capabilities. In the illustrated feedback arrangement, a modulo-2 adder 42 is responsive at any instant both to the electrical pulses which are generated upon read-out of an intermediate core, $28_{(A)}$, in the "One" state, and to the electrical pulses which are generated upon read-out of the last core, $28_{(n)}$, when it is in the "One" state. These positive pulses appear in the lines 43 and 44, respectively, from whence they may be effective to trigger the respective adder transistors 45 and 46. The resulting current pulses through halves of the center-tapped primary of transformer 47 cause an output to appear in line 48 from the rectifier bridge 49 whenever only one or the other of the transistors 45 and 46 is triggered into high conduction by the incoming pulses on one or the other of lines 43 and 44, and not otherwise (i.e. not when pulses are received simultaneously, nor when no pulses appear in both of these two lines). Core $28_{(1)}$ is thus automatically re-set to the "One" state only when either core $28_{(A)}$ alone or $28_{(n)}$, alone is read out from the "One" state. The specific decision logic involved in any such counter unit depends upon the total number of cores involved, and the positions of the two cores from which the information supplied to the adder 42 is derived. By the way of typical examples, a seventeen-core counter in which the sixteenth and seventeenth cores provide the output pulses to trigger the adder transistors has a countdown cycle of 131,071 counts, and a nineteen-core counter in which the twelfth and nineteenth cores provide the output pulses to trigger the adder transistors has a countdown cycle of 524,287 counts. These same recycling periods are, respectively, over 36 hours (1½ days) and 145 hours (6 days) in the case of a counter having shift pulses applied to it at the rate of one cycle per second under control of a low-frequency RC oscillator. Countdown periods of many years are readily obtainable with but relatively few miniature lightweight cores, occupying little volume.

A recurring core magnetization pattern of interest is advantageously detected and translated into an electrical output signal by the polarized voltage detector 50. This detector is shown connected to distinguish the pulse conditions appearing at one locus in the feedback shift register 28, and also, via a logical summation circuit, at all other corresponding stages in the register. A comparison of these detected conditions, on an instantaneous basis, characterizes whether or not the feedback shift register has automatically reproduced a predetermined core magnetization pattern, which re-appears cyclically as the system oscillator advances the countdown in the register. Sensing of the instantaneous voltage conditions involves negligible power drain on the counting register, which is a particularly important consideration in a long-term timer having a very limited supply of power. The detector 50 itself is passive, and consumes no power except when momentarily triggered by pulses which are in an input combination calling for the production of an output signal. With this arrangement, there is no need for power-dissipating samplings of the core or capacitor conditions in the counting register, and such outputs as are derived from the register need not be at the relatively high power levels one might expect would be required to drive succeeding stages, indicating or signalling devices, and the like. In the illustrated embodiment, detector 50 includes a transistor 51 which is normally in an essentially non-conducting state but is rendered conductive by application of a pulse to its base from input line 52, provided the transistor 53 is not also rendered highly conductive at such moments by application of a pulse to its base from input line 54. A pulse appears on line 52 only when the one specific core $28_{(A)}$, of the counter register is being set to the "One" state by stored information transferred to it from the next-preceding stage of the register. On the other hand, a pulse appears on line 54 whenever any one of the other cores in the register is being similarly set. Therefore, the only time when a voltage pulse can appear in line 52 but not in line 54, which is the condition needed for detector 50 to produce an output signal, is when the critical core $28_{(A)}$ is being set to a "One" state and all others are left in the "Zero" magnetization state. This result can be obtained because the pulse outputs from all the cores in the register, except from the core feeding the critical core 28$_{(A)}$, are tapped and coupled to the line 54 through the semiconductor diodes 55 which form an "OR"-type circuit passing a higher voltage pulse at any one or more of the tapped sites on to the line 54; line 54 thus exhibits a low voltage only when none of the tapped core stages being shifted has been in a "One" state. When this condition is not satisfied, the detector transistor 53 is pulsed on, and the resulting drop across the resistor 56 common to the circuitry of both transistors 53 and 51 biases the latter so that it will not conduct even if a pulse appears on its base. At times when the line 54 is clear of pulses, the occurrence of a pulse in the other line, 52, will successfully trigger transistor 51, and this in turn effects a triggering of the power output stage transistor 57 such that a strong timed output pulse will appear on output line 58. Output circuitry 59 responds to the timed pulses delivered to it, and, in one system arrangement, this circuitry may directly serve a timed device such as a signal, heavy-duty electrical switch, firing element, or the like. As the block diagramming illustrates, the output circuitry advantageously involves further timing stages which extend the timing capacity of the system, in which case a further shift register driver 60 is used to excite another magnetic core type counter, 61 (such as a modulus counter), to further delay actuation of the timed device 62. Stages 60 and 61 are of course caused to operate over low duty cycles, also, in the manner of stages 11' and 28.

Timers constructed in accordance with these teachings may develop extremely long delays, of the order of many years, for example, with a high degree of precision. However, the low-frequency RC-controlled oscillator need not produce successive pulses with an exceptional degree of precision, inasmuch as slight variations in the periodicity of such pulses do not affect the over-all timing appreciably; instead, the oscillator need only preserve good accuracy in its average pulse rate. For factory and laboratory test purposes, only, certain characteristics of the systems may be quickly checked out by injecting pulses at a very much higher rate than the few hundred pulses per second rate which would be a maximum for optimum utilization of the present teachings. In the example of a one-year timer, normally to be pulsed but once a second, the injection of pulses in the megacycle range readily permits the timer to complete a test cycle in but thirty seconds; the uses of various codes, feedback arrangements, and so forth, may thus be quickly evaluated also. On the other hand, in intended timing operations, such high test frequencies would not prove adequate both because of the higher average power consumptions necessarily involved and because of the complications (including power losses) caused by stray capacitance effects. For some purposes it can be valuable to provide for intermediate timed outputs, as well as an output occurring at the maximum possible elapsed time, and these may of course be derived through use of the output from a polarized voltage detector and logic arrangement such as is displayed in FIGURE 2. Various codes and recirculation patterns in various types of multistage and feedback counters may be selected for use; however, codes restricted to the use of but few "Ones" in the cores are preferred because the peak power requirements of the registers are then minimized. Magnetic core elements are highly advantageous in the counting operations inasmuch as they function well with only relatively low peak power pulses persisting over very short periods. Although the illustrated coding has involved initial setting of only the first core in an array, use of a different coding may involve the setting of more than one core.

Although specific practices have been described, and although particular embodiments have been illustrated and referred to in the specification, it should be understood that various changes, modifications and substitutions may be effected without departure from these teachings, and it is aimed in the appended claims to embrace all such variations as fall within the true spirit and scope of this invention.

What we claim as new and desire to secure by Letters Patent of the United States is:

1. Electrical timing apparatus comprising means generating relatively short electrical pulses at a low repetition rate of up to about a few pulses per second, said generating means including capacitance means connected with a charging source through high resistance means to control the pulse periodicity, a normally substantially passive magnetic core shift register array having at least one feedback path, means for storing data magnetically in at least one core of said array, means periodically shifting data stored magnetically in said magnetic shift register array in relatively short intervals and at a low repetition rate of up to about a few shifts per second responsive to said pulses, normally substantially non-conductive electrical circuit means, and means responsive to shift of magnetically stored data in said core array for triggering said electrical circuit means into conduction to produce an electrical output signal when the data in said array is shifted to a predetermined pattern therein.

2. Electrical timing apparatus as set forth in claim 1 wherein said triggering means includes means for tapping from more than one stage of the shift register array voltage pulses occurring when magnetically stored data therein is shifted, normally non-conductive electrical logic circuit means, and means applying said tapped voltage pulses to said logic circuit means and rendering said logic circuit means conductive upon occurrence of voltage pulses characterizing the existence of said predetermined pattern in said core array.

3. Electrical timing apparatus comprising RC-controlled pulse generating means producing relatively short electrical pulses at a low repetition rate to develop a low duty cycle of operation, said generating means including capacitance means connected with a charging source through high resistance means to control the periodicity of said pulses, at least one magnetic core shift register array having at least one feedback path, electrical means for storing data magnetically in at least one core of said shift register array, shift register driver means for periodically applying electrical drive pulses to said core array to shift data stored therein at said low repetition rate, said shift driver means including normally substantially non-conductive electrical circuit means triggered into conduction to produce said drive pulses in response to said pulses from said generating means, normally substantially non-conductive electrical output circuit means, and means responsive to shift of magnetically stored data in said core array into a predetermined orientation therein for triggering said output circuit means into conduction to produce a timed output signal.

4. Electrical timing apparatus as set forth in claim 3 wherein said charging source comprises a first substantially constant-voltage electrical power source, and further comprising a second electrical power source energizing said shift driver.

5. Electrical timing apparatus as set forth in claim 3 further comprising switch means for selectably connecting said charging source in circuit in said generating means and for selectably energizing said storing means to store data in at least one core of said shift register array, whereby said output signal is timed in relation to the time when both said connection of said source and said energizing of said storing means have been completed.

6. Electrical timing apparatus as set forth in claim 3 wherein said magnetic shift register array includes at least two banks of magnetic cores in which the cores are coupled in series, at least one of said banks of cores including a feeback connection for recirculation of stored data therethrough, and wherein said shift driver means includes a shift register driver responsive to the outputs of said one of said banks of cores and applying corresponding drive pulses to another of said banks of cores to shift data stored therein.

7. Electrical timing apparatus as set forth in claim 3 wherein said magnetic shift register feedback path includes normally substantialy non-conductive electrical adder circuit means having at least two input circuits and an output circuit at which a pulse output appears in response to conduction in said adder means only when pulse voltages applied to the input circuits are in a predetermined pattern, means applying to said input circuits pulse voltages occurring in different predetermined parts of said register array, and means applying the pulse output from said output circuit to at least one predetermined core in said register array to store data magnetically therein.

8. Electrical timing apparatus as set forth in claim 3 wherein said means responsive to shift of magnetically stored data in said core array includes normally substantially non-conductive electrical detector circuit means having at least two input circuits and an output circuit at which said timed output signal appears in response to conduction in said detector circuit means only when pulse voltages applied to the input circuits are in a predetermined pattern, and means applying to said input circuits pulse voltages occurring in different predetermined parts of said register array.

9. Electrical timing apparatus as set forth in claim 8 wherein said pulse voltage applying means applies the pulse voltages appearing in one core stage of the core array to one of said input circuits, and further comprising a plurality of diodes each having a one common electrode connected to another of said input circuits, and wherein said applying means applies the pulse voltages appearing in other core stages of the core array to different ones of the other electrodes of said diodes.

References Cited

UNITED STATES PATENTS 3,299,401 1/1967 Bolton ------------ 340—174

BERNARD KONICK, *Primary Examiner.*

P. SPERBER, *Assistant Examiner.*